UNITED STATES PATENT OFFICE.

FRANK EDWARD ELMORE, OF BOXMOOR, ENGLAND.

PROCESS FOR THE EXTRACTION OF LEAD FROM ITS ORES.

1,350,959. Specification of Letters Patent. Patented Aug. 24, 1920.

No Drawing. Application filed April 11, 1919. Serial No. 289,412.

*To all whom it may concern:*

Be it known that I, FRANK EDWARD ELMORE, a subject of the King of Great Britain, residing in Boxmoor, England, have invented certain new and useful Improvements in Processes for the Extraction of Lead from Its Ores, of which the following is a specification.

This invention relates to improvements in processes for the extraction of lead from ores, concentrates and the like, in which the lead in the form of sulfate is dissolved out by means of hot brine, or in the form of sulfid is attacked and dissolved out by the action of hot brine to which sulfuric acid has been added, the lead thus brought into solution being afterward recovered as sulfate and chlorid on cooling the liquid.

In some lead ores the metal occurs as native lead sulfate; in others it exists as a compound, for example lead sulfid, which can by suitable treatment be converted into the sulfate. In both cases the lead sulfate may be separated from insoluble matters by extraction with hot brine, the solution when cool yielding crystals consisting of lead sulfate and chlorid.

In the British patent application No. 6546 of 1917 I have described a process of separating lead and zinc from ores containing these metals in the form of sulfids, in which process sulfuric acid, either alone or in conjunction with hot strong brine, is used for attacking the ore. If sulfuric acid alone be used, the lead sulfate formed is afterward extracted by means of hot strong brine which on cooling yields lead sulfate and chlorid as above mentioned. If sulfuric acid in presence of hot strong brine be used, the lead is brought directly into solution and from the liquid lead sulfate and chlorid are obtained on cooling.

In such processes (hereinafter termed "brine processes") there is formed in the brine, as a result of the operation, a certain quantity of sodium sulfate (which term is here used as including the acid sulfate if present); consequently, if the brine be used repeatedly an accumulation of sulfate and a loss of chlorid occur, and eventually a notable falling off in the efficiency of the liquid is observed. Further, the lead salts produced contain lead sulfate and chlorid in proportions which vary with the concentration and other conditions, and a product of this composition in some cases offers disadvantages from the metallurgical standpoint.

One object of the present invention is to effect, in such processes, a removal of sodium sulfate from the used brine, whereby its efficiency is substantially restored. Another object is to convert the lead salts wholly into the sulfate, whereby the lead is obtained in a form more suitable for further metallurgical treatment.

The invention may be carried out either before or after removal of the lead salts from the brine as hereinbefore described. In the latter case the invention broadly consists in (1) eliminating sodium sulfate from the used brine, after removal of the lead salts, by further cooling the liquid to about 0° C., thus causing the excess of sodium sulfate to crystallize out; (2) separating the crystals from the brine and dissolving them in hot water; and (3) with this solution, preferably boiling, treating the lead salts in suitable proportion, whereby the lead chlorid which they contain is converted into sulfate, which is then separated from the solution.

The brine, after removal of the crystals of sodium sulfate, is ready for re-use and may, if desired, be strengthened by the addition of a further quantity of sodium chlorid—for instance, sodium chlorid recovered as hereinafter described.

In the treatment of lead salts for conversion of the chlorid into sulfate, the proportions to be used and other details depend upon the composition of the lead salts and sodium sulfate solution, and other conditions. If the lead salts and crystals of sodium sulfate after removal from the brine have both been washed substantially free from sodium chlorid, it is sufficient, in order to obtain lead sulfate technically free from chlorid, to use approximately the quantity of sulfate solution theoretically equivalent to the lead chlorid present in the salts. If, however, the lead salts and sodium sulfate contain sodium chlorid, a lead sulfate technically free from lead chlorid may nevertheless be obtained if the sodium sulfate solution be added in suitable excess.

The lead salts may be in a dried or drained condition, or in the state of a soft mush, when treated with the hot sulfate solution, and the materials should be agitated or otherwise brought into sufficient contact to promote the reaction.

I prefer to carry out the treatment of the lead salts by steps, so that the conversion takes place progressively instead of in one operation, the lead salts and sulfate solution being passed through the plant in opposite directions. For example, a series of vessels may be employed for the treatment, the fresh sulfate solution being supplied to the first of these and the fresh lead salts to the last. This method insures that the lead salts, after being progressively converted to a substantial extent in the last and intermediate vessels, receive their final treatment with a solution containing the maximum of sulfate and minimum of chlorid, the sodium sulfate being largely in excess of the lead chlorid still to be converted; while on the other hand the sodium sulfate, having been largely converted into chlorid in the first and intermediate vessels, is finally treated with lead salts containing the maximum of chlorid and minimum of sulfate. It is thus possible to obtain, as final products, even from lead salts and sodium sulfate crystals containing sodium chlorid, on the one hand lead sulfate technically free from lead chlorid and on the other a solution of sodium chlorid suitable for addition, either directly or after concentration, to the purified brine.

If the invention be carried out before removal of the lead salts from the brine, the process is modified by cooling the brine and salts to about 0° C., whereby there is obtained, on the one hand, purified brine ready for re-use as hereinbefore described, and, on the other, a mixture of crystals of lead salts and sodium sulfate. The mixture, after removal from the liquid, is treated with hot, preferably boiling, water, whereby conversion of lead chlorid into the sulfate and sodium sulfate into the chlorid is effected. It will be understood that according to the composition of the mixture some adjustment of the proportions, for example by adding lead salts or sodium sulfate from other sources, may be required.

In some cases the lead salts contain an appreciable proportion of silver, derived from the ore, and a further object of the invention is to provide a method of concentrating and recovering this silver if desired in a form better fitted for metallurgical treatment. In carrying out this modification of the invention the lead salts, after separation from the brine, are boiled wih sufficient water to dissolve substantially the whole of the lead chlorid; there are thus obtained a solution of lead chlorid and a comparatively small, undissolved residue of lead sulfate containing practically the whole of the silver. The lead chlorid, after separation from the argentiferous lead sulfate, is then treated with hot sodium sulfate solution for conversion into lead sulfate.

Having thus described the nature of the said invention and the best means I know of carrying the same into practical effect, I claim:—

1. The herein described improvement in brine processes for the extraction of lead from its ores consisting in first cooling the used brine to deposit lead salts, further cooling the brine to about 0° C. and converting the lead salts into lead sulfate technically free from chlorid by means of sodium sulfate derived from the brine by the said further cooling.

2. In brine processes for the extraction of lead from its ores, cooling the used brine to deposit lead salts; separating the deposited lead salts from the brine; further cooling the brine thus separated from lead salts to about 0° C.; separating the purified brine from the crystallized sodium sulfate obtained; preparing a hot aqueous solution of the latter, and with the hot, preferably boiling, solution converting the lead salts into lead sulfate technically free from chlorid; and separating the lead sulfate from the liquid.

3. Process as claimed in claim 2, in which the conversion of the lead salts into sulfate is effected progressively by passing the lead salts and the sodium sulfate solution through the plant in opposite directions in such manner that the lead salts are treated progressively with sodium sulfate solution of increasing freedom from chlorid substantially as described.

4. In brine processes for the extraction of lead from its ores, concentrating and recovering the silver contained in the lead salts by boiling the latter with sufficient water to dissolve substantially the whole of the lead chlorid therefrom, separating the argentiferous lead sulfate from the solution, and converting the lead chlorid into sulfate technically free from chlorid by means of sodium sulfate derived from the brine, substantially as described.

In testimony whereof I have signed my name to this specification.

FRANK EDWARD ELMORE.